United States Patent
Cook

(10) Patent No.: US 7,483,668 B2
(45) Date of Patent: Jan. 27, 2009

(54) METHOD FOR ACHIEVING ACCURATE PAGE MARGINS ON A MEDIA AND DUPLEX IMAGING APPARATUS THEREOF

(75) Inventor: Brian Dale Cook, Nicholasville, KY (US)

(73) Assignee: Lexmark International, Inc, Lexington, KY (US)

(*) Notice: Subject to any disclaimer, the term of this patent is extended or adjusted under 35 U.S.C. 154(b) by 491 days.

(21) Appl. No.: 11/378,216

(22) Filed: Mar. 17, 2006

(65) Prior Publication Data

US 2007/0220422 A1  Sep. 20, 2007

(51) Int. Cl.
*G03G 15/00* (2006.01)

(52) U.S. Cl. .................. 399/364; 399/306

(58) Field of Classification Search .............. 399/16, 399/17, 306, 363, 364, 367–369, 373
See application file for complete search history.

(56) References Cited

U.S. PATENT DOCUMENTS 6,118,950 A * 9/2000 Wibbels et al. .............. 399/16
7,103,306 B2 * 9/2006 Shimizubata ............... 399/306

* cited by examiner

*Primary Examiner*—Lamson D Nguyen

(57) ABSTRACT

A method for achieving accurate page margins on a media and a duplex imaging apparatus thereof. The method comprises: detecting a leading edge position by an edge sensor and a first left-to-right position of the media by an alignment sensor in a first imaging path; imaging a first side of the media in a print zone of the duplex imaging apparatus; removing the media from the print zone and disposing the media in a second imaging path; detecting a leading edge position by the edge sensor and a second left-to-right position of the media by the alignment sensor; determining a carrier reset distance by calculating a difference between first and second left-to-right positions, and shifting a print image by a distance substantially equal to the carrier reset distance thereby achieving accurate page margins for imaging a second side of the media with the print image. In another embodiment, the first left-to-right position can be determined by feeding the media into a preset first left-to-right position.

24 Claims, 3 Drawing Sheets

METHOD FOR ACHIEVING ACCURATE PAGE MARGINS ON A MEDIA AND DUPLEX IMAGING APPARATUS THEREOF

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present disclosure relates generally to imaging systems, and, more particularly, to a method for achieving accurate page margins on a media in duplex printers.

2. Description of the Related Art

In media printing environment, it is important to assure that printing onto a media is performed accurately, i.e., the printing onto the media is achieved with accurate page margins. For example, in an inkjet printer, if the media is not aligned with the printhead of the inkjet printer, the ink will not print on a media in a proper position, and a corresponding image may not be placed on the media in the proper position. To achieve accurate page margins, a media 10 is positioned in a print zone in a default position, such that, the image is placed on the media 10 with desired top, left, right and bottom margins, as shown in FIG. 1 (PRIOR ART). More specifically, the media 10 is positioned in the input tray between two edge guides 14. Alternatively, the media 10 is positioned in the input tray between one edge guide and a side wall. The edge guides 14 control the left-to-right position to get a desired left-to-right position 18 of the media 10 as the media 10 is picked from the input tray into a print zone, thereby, aligning the media 10 with a feed roller 16 of the inkjet printer, while ensuring that the media 10 is fed perpendicular to the feed roller 16. The edge guides 14 have no effect on the media 10 after it enters the print zone. A leading edge position of the media 10 is detected with an edge sensor to determine accurate placement for the desired top margin, and thereafter, the media 10 is imaged in the print zone.

Printing onto the media 10 with accurate page margins in duplex printers (capable of printing on both sides of the media 10 (without user intervention) involves additional issues of misalignment of the media 10 with the printhead of duplex printers. As shown in FIG. 2 (PRIOR ART), in a duplex printer, with center alignment of media 10, the positioning of the media 10 for a first side imaging, i.e., imaging on a first side of the media 10, is controlled as described with reference to FIG. 1. Thereafter, the media 10 is removed from a print zone and flipped over in a duplex imaging path before being returned to the print zone for a second side imaging, i.e., imaging on a second side of the media 10, when fed perpendicular to the feed roller 16. During the flipping of the media 10, the media 10 may shift from a desired location, resulting in misalignment of the media 10. The misalignment may be to the left or right of the desired location of the media 10, or it may be angled relative to its desired location. The media 10 has to be aligned with the printhead of the duplex printer to achieve accurate page margins in second side imaging of the media 10.

Accordingly, in the prior art, several approaches have been used for alignment of media 10 for achieving accurate page margins during second side imaging in a duplex printer. These approaches utilize the repositioning of the media 10 to the desired location by moving the media 10 towards or away from a reference edge/wall. For example, the media 10 is aligned by applying a force 24 (referred to as an alignment force) to push the media 10 against an alignment wall 34 to reposition the media 10 to a desired left-to-right position 38 of the media 10. The alignment wall 34 ensures that the position of the media 10 is not shifted to an unacceptable amount during flipping. However, during this alignment process, the alignment force may be large enough to cause the media 10 to be stressed, and consequently the media 10 may be damaged during alignment. On the other hand, the alignment force may be small enough not to result in a proper alignment of the media 10 against the alignment wall 34. Moreover, the limitations on the alignment force restrict how far the media 10 may be pushed, thereby, limiting the media widths for duplex printing to standard sizes, such as, A4 size and Letter size that need very little left-to-right movement to contact the alignment wall 34.

None of the conventional approaches used for alignment of a media with a printhead of a duplex printer for achieving accurate page margins during second side imaging have successfully addressed the misalignment issues due to media damage, associated hardware costs, and limitations in media widths.

Accordingly, what is needed in an approach providing a method for achieving accurate page margins on a media in a duplex printer, while eliminating the issues of media damage and reducing associated hardware costs and limitations in media widths.

SUMMARY OF THE INVENTION

In view of the foregoing disadvantages inherent in the prior art, the general purpose of the present disclosure is to provide a method for achieving accurate page margins on a media in duplex imaging apparatus, to include all the advantages of the prior art, and to overcome the drawbacks inherent therein.

In one aspect, the present disclosure provides a method for achieving accurate page margins on a media in a duplex imaging apparatus. The method comprises: detecting a leading edge position of the media in a first imaging path; determining a first left-to-right position of the media in the first imaging path; imaging a first side of the media with a first print image in a print zone of the duplex imaging apparatus; removing the media from the print zone and disposing the media in a second imaging path; detecting a leading edge position of the media in the second imaging path; detecting a second left-to-right position of the media in the second imaging path; determining a carrier reset distance by calculating a difference between the first left-to-right position and the second left-to-right position; shifting a second print image by a distance substantially equal to the carrier reset distance for achieving accurate page margins for imaging a second side of the media; and imaging the second side of the media with the second print image in the print zone.

In another aspect, the present disclosure provides a method for achieving accurate left-to-right page margin on a media in a duplex printer. The method comprises: determining a first left-to-right position of the media in a first imaging path; detecting a second left-to-right position of the media in a second imaging path; determining a carrier reset distance by calculating a difference between the first left-to-right position and the second left-to-right position; and shifting a print image by a distance substantially equal to the carrier reset distance for achieving accurate left-to-right page margin for imaging a second side of the media with the print image.

In yet another aspect, the present disclosure provides a duplex imaging apparatus, comprising: a printhead carrier disposed perpendicularly to a print zone; an alignment sensor communicatively coupled to the printhead carrier; an edge sensor communicatively coupled to the printhead carrier and/or a feed roll unit; a feed roll unit capable of feeding a print media into the print zone to the printhead carrier; and a controller communicatively coupled to the printhead carrier, alignment sensor, edge sensor and the feed roll unit, the controller having programmable instructions for performing a method, comprising: detecting a leading edge position of the print media in a first imaging path using the edge sensor; determining a first left-to-right position of the print media in the first imaging path using the alignment sensor; imaging a first side of the print media with a first print image in the print zone; removing the print media from the print zone and disposing the print media in a second imaging path; detecting a leading edge position of the print media in the second imaging path using the edge sensor; detecting a second left-to-right position of the print media in the second imaging path using the alignment sensor; determining a carrier reset distance by calculating a difference between the first left-to-right position and the second left-to-right position; adjusting the printhead carrier for shifting a second print image by a distance substantially equal to the carrier reset distance for achieving accurate page margins for imaging a second side of the media; and imaging the second side of the print media with the second print image in the print zone.

In these various aspects of the invention, determining the first left-to-right position includes detecting the first left-to-right position or feeding the media to a preset location that is used as the first left-to right position.

These together with other aspects of the invention, along with the various features of novelty that characterize the invention, are pointed out with particularity in the claims annexed hereto. For a better understanding of the invention, its operating advantages, and the specific aspects attained by its uses, reference should be made to the accompanying drawings and descriptive matter in which, there are illustrated exemplary embodiments of the present invention.

BRIEF DESCRIPTION OF THE DRAWINGS

The above-mentioned and other features and advantages of the present invention, and the manner of attaining them, will become more apparent, and will be better understood by reference to the following description of embodiments of the present disclosure taken in conjunction with the accompanying drawings, wherein.

Like reference numerals refer to like parts throughout several views of the drawings of the present disclosure.

DETAILED DESCRIPTION

Figure 1:
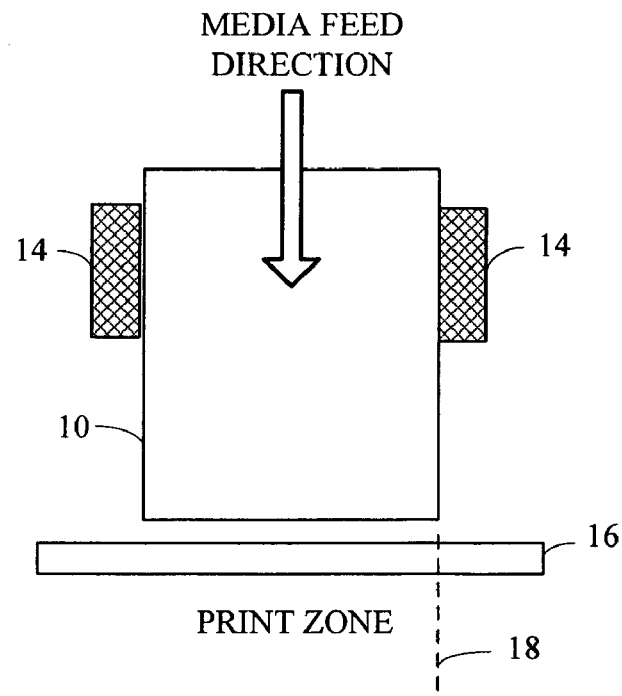
FIG. 1 is a prior art diagram illustrating the edge guides 14 controlling the left-to-right position of the media 10 during imaging.
Figure 2:
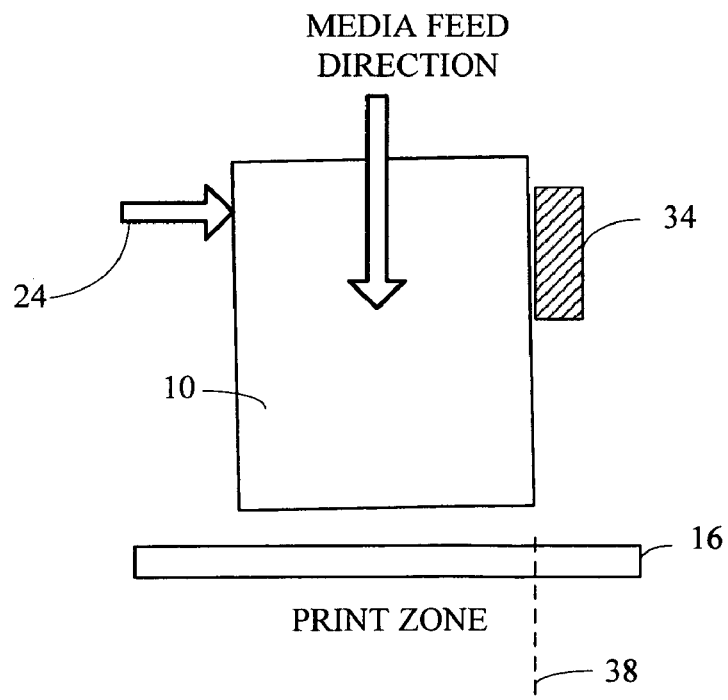
FIG. 2 is a prior art diagram illustrating the alignment wall 34 controlling left-to-right position of the media 10 in duplex imaging path during duplex imaging.

It is to be understood that the present invention is not limited in its application to the details of the method, the construction and the arrangement of components set forth in the following description or illustrated in the drawings. The present invention is capable of having other embodiments and being practiced or being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof, herein are used broadly and encompass direct and indirect connections, couplings, and mountings. In addition, the terms "connected" and "coupled" and variations thereof are not restricted to physical or mechanical connections or couplings.

In addition, it should be understood that embodiments of the present invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present invention may be implemented in a software. As such, it should be noted that a plurality of hardware and software-based devices, as well as a plurality of different structural components may be utilized to implement the present invention. Furthermore, and as described in subsequent paragraphs, the specific mechanical configurations illustrated in the drawings are intended to exemplify embodiments of the present invention and that other alternative mechanical configurations are also possible.

As used herein, the terms "first," "second," and so forth, herein do not denote any order, quantity, or importance, but rather are used to distinguish one element from another, and, the terms "a" and "an" do not denote a limitation of quantity, but rather denote the presence of at least one of the referenced item.

The present invention provides a method for achieving accurate page margins on a media (i.e. a print media, such as, paper) in a duplex imaging apparatus. Such a duplex imaging apparatus is capable of imaging (printing) on both sides of the print media, while ensuring that accurate page margins are maintained on both sides of the print media after the duplex printing operation. Further, the duplex imaging apparatus embodying the present disclosure does not limit the media widths for use in duplex imaging. Also, the duplex imaging apparatus eliminates the use of any hardware components for aligning the print media, thereby, preventing any damage to the print media, and further eliminating the hardware costs associated therewith.

Figure 3:
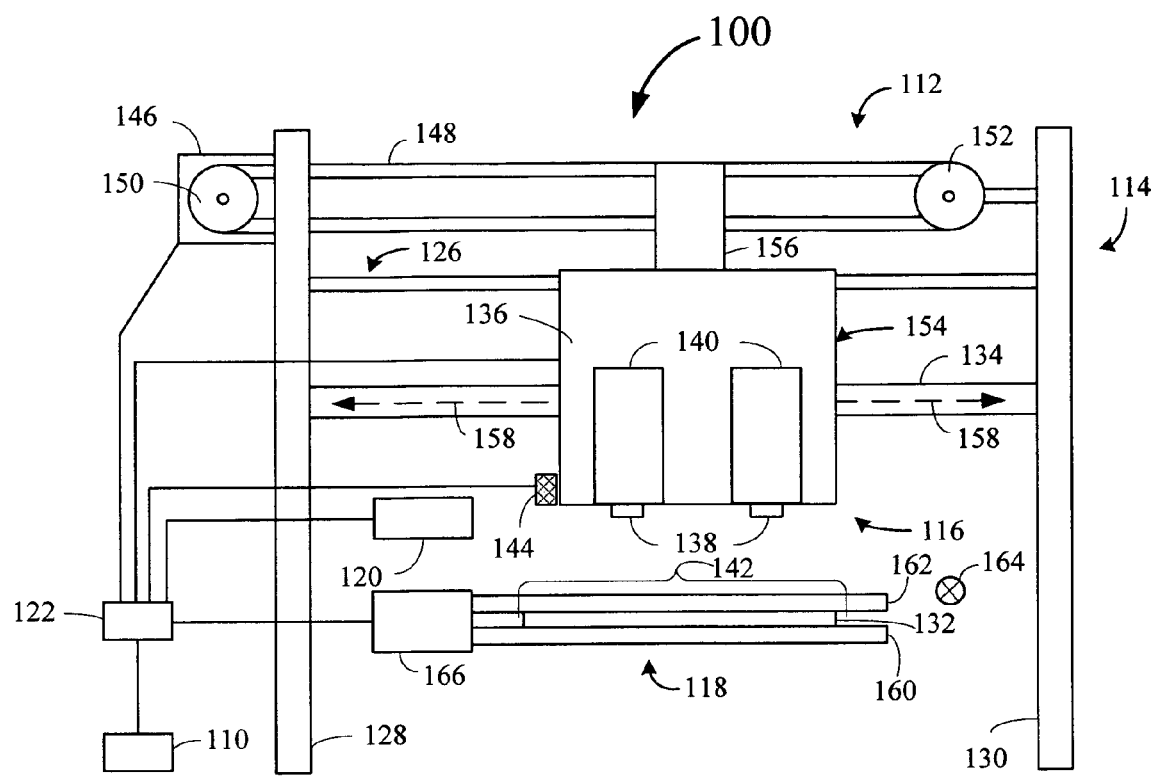
FIG. 3 is a schematic diagram illustrating an imaging system 100, according to an exemplary embodiment of the invention.

Referring to FIG. 3, an imaging system 100 is shown. The imaging system 100 comprises a host computer 110 and a duplex imaging apparatus 112. Such a duplex imaging apparatus 112 may take form of an ink jet printer.

The host computer 110 may take form of a personal computer comprising a display device, such as, a monitor (not shown), an input device, such as, a keyboard (not shown), a processor (not shown), input/output interfaces (not shown), memory (not shown) such as, RAM, ROM, NVRAM, and the like, and a data storage device (not shown) such as hard drive, floppy disks, compact disks, and the like. The memory includes a printer driver in the form of programmable instructions.

The duplex imaging apparatus 112 may comprise a frame 114, a printhead carrier system 116, a feed roll unit 118, a media selection unit 120, a controller 122, and a mid-frame (not shown). The frame 114 may include a cross member 126, a first frame side 128, and a second frame side 130. A media source (not shown) can be configured to receive a plurality of media from which an individual print media 132 is displaced by the media selection unit 120 and transported to the feed roll unit 118. The feed roll unit 118, in turn, transports the print media 132 during the imaging operation. Suitable print media 132 may include, but not be limited to, plain paper, coated paper, photo paper, and transparency media.

The printhead carrier system 116 may comprise a carrier shaft 134 and a printhead carrier 136 for mounting and carrying one or more printheads 138. The printhead 138 may be a color printhead or a monochrome printhead or a combination of the aforesaid. The printhead 138 may contain a series of nozzles to spray drops of ink on the print media 132 during the imaging operation. An inkjet reservoir 140 (for example, a color inkjet reservoir or a monochrome inkjet reservoir) is provided in fluid communication with the printhead 138. The printhead carrier system 116 can be configured for printing on both sides of the print media 132, without user intervention. The printhead carrier 136 may transport printhead 138 across the print media 132 to define a print zone 142 of the duplex imaging apparatus 112. The printhead carrier system 116 can further include an alignment sensor 144 attached to the printhead carrier 136. The alignment sensor 144 may be, for example, an optical sensor including a light source, such as a light emitting diode (LED), and a reflectance detector, such as a phototransistor. The alignment sensor 144 may be used to read an ink pattern and for adjusting "timing offset" of the printhead 138 as required. The alignment sensor 144 can be configured to detect a left-to-right position of the print media 132 when the print media 132 is received in the print zone 142 of the duplex imaging apparatus 112. An edge sensor (not shown) may be communicatively coupled to the feed roll unit 118 and/or the printhead carrier 136 and such an edge sensor can be capable of detecting a leading edge position of the print media 132. The leading edge position, also referred as a front edge position, is a position of an edge of the media 132 that is first fed into the print zone 142.

Figure 4:
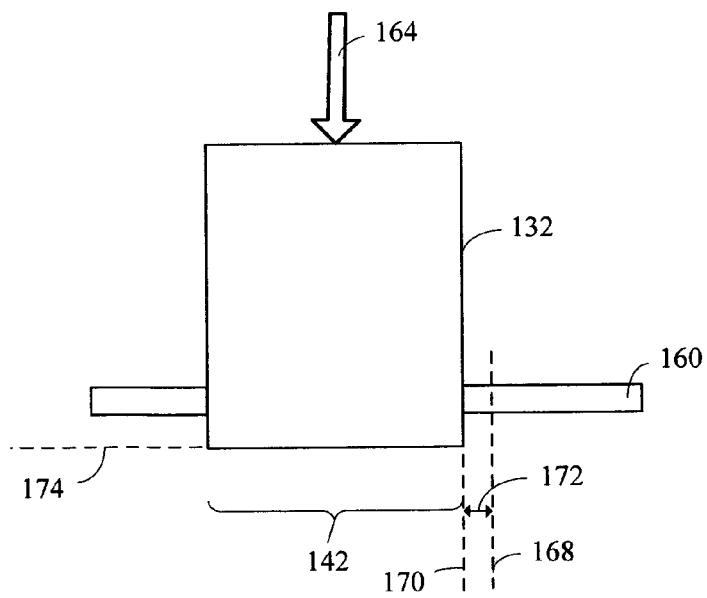
FIG. 4 is a schematic top plan view illustrating the determination of a carrier reset distance, according to an exemplary embodiment of the invention.

The printhead carrier system 116 further comprises a carrier drive system including a carrier motor 146, a carrier belt 148, a carrier pulley 150, and an idler pulley 152. The printhead carrier 136 includes a carrier housing 154 having a carrier attachment device 156. The printhead carrier 136 may be guided by the carrier shaft 134 and cross member 126. The carrier shaft 134 can be configured to define a bi-directional scanning direction 158, perpendicular to a media feed direction 164 (further illustrated in FIG. 4) of the print media 132.

The feed roll unit 118 includes a feed roller 160 and corresponding index pinch rollers 162. Drive unit 166, includes a drive source, such as, a stepper motor (not shown) and an associated drive mechanism, such as a gear train or belt/pulley arrangement (not shown). The feed roll unit 118 feeds the print media 132, in a direction, depicted as X inside a circle to indicate that the media feed direction 164 is out of the plane of FIG. 3 towards the reader.

The controller 122 includes microprocessor (not shown) configured to execute programmable instructions to effect the printing of an image on the print media 132. The controller 122 co-ordinates with the printer driver in the memory of the host computer 110 via communication means. The communication means may include a direct electrical connection, or a network connection (e.g., LAN or wireless LAN). In a network environment, communication between the host computer 110 and the duplex imaging apparatus 112 may be facilitated using a standard communication protocol, such as, the Network Printer Alliance Protocol. In one embodiment, the controller 122 may be communicatively coupled to the printhead carrier 136, alignment sensor 144, edge sensor (not shown), and the drive unit 166 of the feed roller 160.

Figure 5:
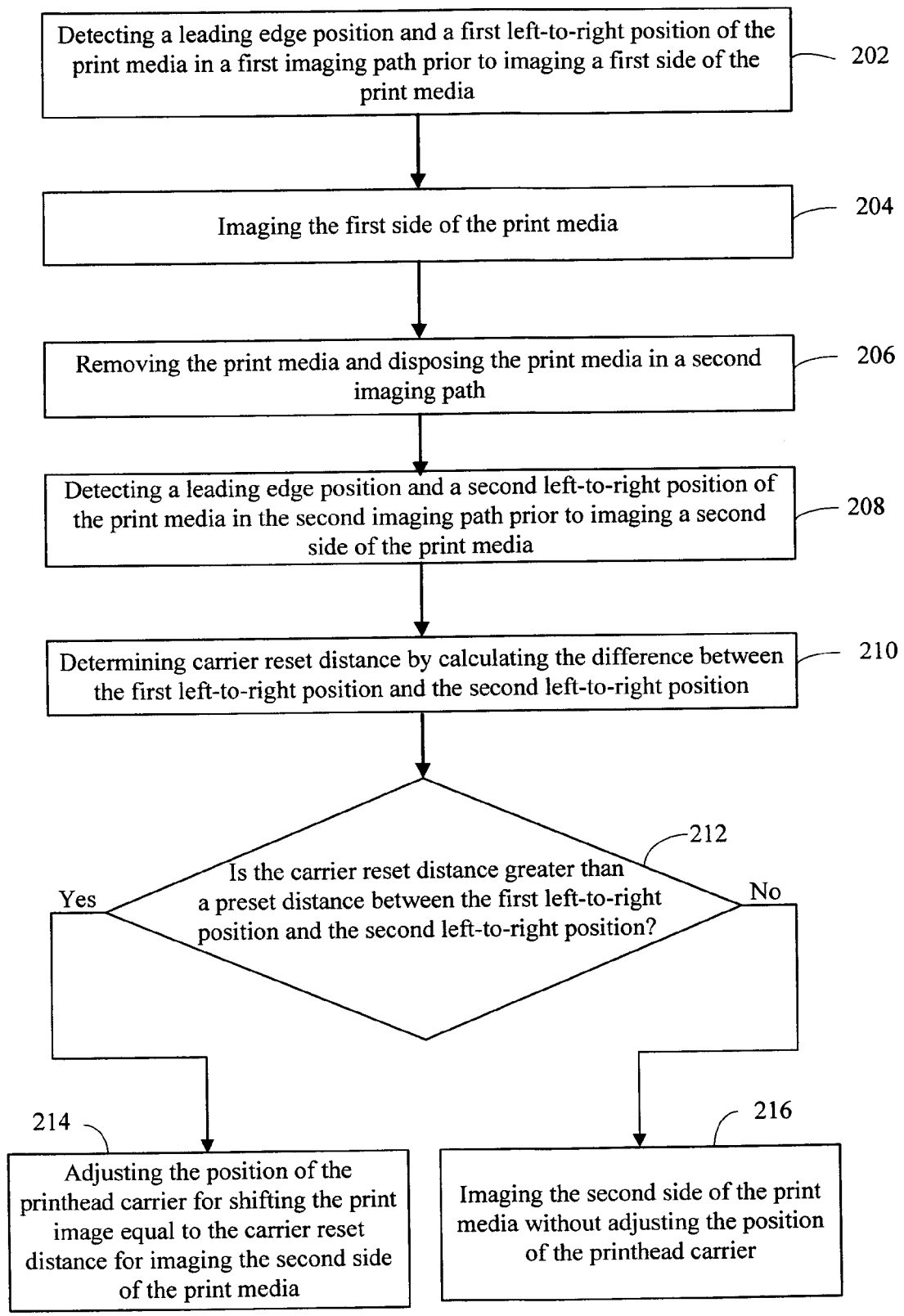
FIG. 5 is a flowchart illustrating a method for achieving accurate page margins on a print media 132 in a duplex printer, according to an exemplary embodiment of the invention.

Referring now to FIG. 5, a flowchart illustrating one exemplary method for achieving accurate page margins on the print media 132 in the duplex imaging apparatus 112, is shown. Prior to imaging the first side of the print media 132, a leading edge position (not shown) of the print media 132 in a first imaging path can be detected using the edge sensor, and a first left-to-right position 168 of the print media 132 in the first imaging path, (also referred to as nominal edge position, see FIG. 4), can be detected using the alignment sensor 144 (see FIG. 3), at step 202. After imaging the first side of the print media 132 at step 204, the print media 132 is removed from the print zone 142 of the duplex imaging apparatus 112, and disposed in a second imaging path (i.e., the duplex imaging path) for imaging the second side of the print media 132, as shown at step 206. In one embodiment, the print media 132 is flipped over prior to disposing the print media 132 in the second imaging path for imaging the second side of the print media 132. The print media 132 may be aligned with the feed roller 160, such that, the print media 132 may be fed perpendicular to the print zone 142. Next, a leading edge position 174 of the print media 132 in the second imaging path can be detected using the edge sensor and a second left-to-right position 170 (also referred to as actual edge position, see FIG. 4) of the print media 132 in the second imaging path is detected using the alignment sensor 144 of the printhead carrier system 116, at step 208. Next, a carrier reset distance 172 (see FIG. 4) is determined by calculating a difference between the first left-to-right position 168 and the second left-to-right position 170, as shown at step 210. Now, the imaging system 100 checks whether the carrier reset distance 172 is greater than a preset distance between the first left-to-right position 168 and the second left-to-right position 170, at step 212. On determining that the carrier reset distance is greater than the preset distance between the first left-to-right position 168 and the second left-to-right position 170, the position of the printhead carrier 136 is adjusted for shifting a print image substantially equal to the carrier reset distance, thereby achieving the accurate page margins for imaging the second side of the print media 132 and the second side of the print media is imaged, at step 214. In the event of determining that the carrier reset distance is less than the preset distance between the first left-to-right position 168 and the second left-to-right position 170, the second side of the print media is imaged without adjusting the position of the printhead carrier 136, as shown at step 216. The preset distance can be in the range of about 2 millimeters or less.

The foregoing description of several methods and embodiments of the present disclosure have been presented for purposes of illustration. It is not intended to be exhaustive or to limit the present disclosure to the precise steps and/or forms disclosed, and obviously many modifications and variations are possible in light of the above teaching. It is intended that the scope of the present disclosure be defined by the claims appended hereto.

What is claimed is:

1. A method for achieving accurate page margins on a media in a duplex imaging apparatus, comprising:
   determining a first left-to-right position of the media in a first imaging path;
   detecting a second left-to-right position of the media in the second imaging path;
   determining a carrier reset distance based on the first left-to-right position and the second left-to-right position;
   shifting a second print image based on the carrier reset distance for imaging a second side of the media; and
   imaging the second side of the media with the second print image in a print zone.

2. The method of claim 1, wherein determining the first left-to-right position further comprises feeding the media into a preset first left-to right position.

3. The method of claim 1, wherein determining the first left-to-right position further comprises detecting the first left-to-right position.

4. The method of claim 3, wherein at least one of the first left-to-right position or the second left-to-right position of the media is detected using an alignment sensor.

5. The method of claim 4, wherein the alignment sensor is an optical sensor comprising a light source and a reflectance detector.

6. The method of claim 1, wherein the method further comprises detecting a leading edge position of the media in a second imaging path prior to imaging the second side wherein the leading edge position of the media is detected using an edge sensor of the duplex imaging apparatus.

7. The method of claim 6, wherein the edge sensor is an optical sensor comprising a light source and a reflectance detector.

8. The method of claim 1, wherein the shifting of the second print image based on the carrier reset distance occurs when the carrier reset distance equals or exceeds a preset distance.

9. The method of claim 1, wherein the method further comprises:
   detecting a leading edge position of the media in a first imaging path;
   imaging a first side of the media with a first print image in a print zone of the duplex imaging apparatus; and
   removing the media from the print zone and disposing the media in a second imaging path.

10. The method of claim 1, wherein the method further comprises aligning the media with a feed roller of the duplex imaging apparatus such that during imaging the media is fed perpendicular to the print zone of the duplex imaging apparatus.

11. A method for achieving accurate left-to-right page margin on a media in a duplex printer, comprising:
    determining a first left-to-right position of the media in a first imaging path;
    detecting a second left-to-right position of the media in a second imaging path;
    determining a carrier reset distance by calculating a difference between the first left-to-right position and the second left-to-right position; and
    shifting a print image by a distance substantially equal to the carrier reset distance for achieving accurate left-to-right page margin for imaging a second side of the media with the print image.

12. The method of claim 11, wherein determining the first left-to-right position further comprises feeding the media into a preset first left-to right position.

13. The method of claim 11, wherein determining the first left-to-right position further comprises detecting the first left-to-right position.

14. The method of claim 13, wherein the first left-to-right position and the second left-to-right position of the media are detected using an alignment sensor of the duplex printer.

15. The method of claim 14, wherein the alignment sensor is an optical sensor comprising a light source and a reflectance detector.

16. The method of claim 11, wherein a leading edge position of the media in the first imaging path and a leading edge position of the media in the second imaging path are detected using an edge sensor of the duplex printer.

17. The method of claim 16, wherein the edge sensor is an optical sensor comprising a light source and a reflectance detector.

18. The method of claim 11, wherein the shifting of the second print image based on the carrier reset distance occurs when the carrier reset distance equals or exceeds a preset distance.

19. The method of claim 11, wherein the media is aligned with a feed roller of the duplex printer such that the media is fed perpendicular to a print zone of the duplex printer.

20. A duplex imaging apparatus, comprising:
    a printhead carrier disposed perpendicularly to a print zone;
    a feed roll unit for feeding a print media into the print zone;
    an alignment sensor communicatively coupled to the printhead carrier;
    an edge sensor communicatively coupled to one of the printhead carrier, the feed roll unit and both the printhead carrier and feed roll unit; and
    a controller communicatively coupled to the printhead carrier, alignment sensor, edge sensor and the feed roll unit, the controller having programmable instructions for performing a method, comprising:
       detecting a leading edge position of the print media in a first imaging path using the edge sensor;
       detecting a first left-to-right position of the print media in the first imaging path using the alignment sensor;
       imaging a first side of the print media with a first print image in the print zone;
       removing the print media from the print zone and disposing the print media in a second imaging path;
       detecting a leading edge position of the print media in the second imaging path using the edge sensor;
       detecting a second left-to-right position of the print media in the second imaging path using the alignment sensor;
       determining a carrier reset distance by calculating a difference between the first left-to-right position and the second left-to-right position;
       adjusting the printhead carrier for shifting a second print image by a distance substantially equal to the carrier reset distance for achieving accurate page margins for imaging a second side of the media; and
       imaging the second side of the print media with the second print image in the print zone.

21. The duplex imaging apparatus of claim 20, wherein the duplex imaging apparatus is communicatively coupled to a host computer with a memory having printer driver capable of sending print instructions to the duplex imaging apparatus.

22. The duplex imaging apparatus of claim 20, wherein the edge sensor is an optical sensor comprising a light source and a reflectance detector.

23. The duplex imaging apparatus of claim 20, wherein the alignment sensor is an optical sensor comprising a light source and a reflectance detector.

24. The duplex imaging apparatus of claim 20, wherein the adjusting of the second print image by a distance substantially equal to the carrier reset distance occurs when the carrier rest distance equals or exceeds a preset distance.

* * * * *